United States Patent Office 3,469,006
Patented Sept. 23, 1969

3,469,006
CONTROL OF GASTROPODS WITH SUBSTITUTED SALICYLANILIDES
Frank A. Ehrenford, Zionsville, Ind., assignor to The Dow Chemical Company, Midland, Mich., a corporation of Delaware
No Drawing. Filed Nov. 3, 1966. Ser. No. 591,698
Int. Cl. A01n 9/20
U.S. Cl. 424—230     3 Claims

ABSTRACT OF THE DISCLOSURE

Gastropods are controlled by a method in which the gastropods, their ova or their habitats are treated with halosalicylanilides corresponding to the formula

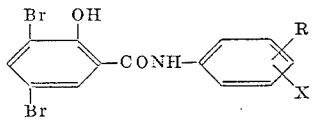

wherein R represents methoxy or ethoxy and X represents chlorine, bromine or hydrogen.

---

The present invention is directed to a method for controlling gastropods and their ova and particularly to the use of certain substituted salicylanilide compounds as gastropodicides.

Gastropods, members of the class Gastropoda, cause considerable damage to plants as well as being vectors for many animal and human parasites such as Fasciola species, Clonorchis species, Opisthorchis species, Schistosoma species, etc. Thus various health agencies as well as farmers and horticulturists are interested in methods of killing and controlling gastropods and gastropod eggs or ova with a minimum effect upon the flora and other fauna found in the gastropod's environment.

The method of the present invention comprises contacting gastropods and/or their ova and/or their habitats with a compound selected from the group consisting of halosalicylanides corresponding to the formula

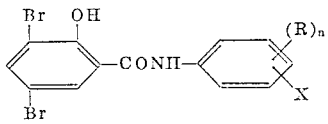

wherein R represents methoxy or ethoxy, X represents chlorine or bromine or hydrogen and $n$ represents one of the integers 1 or 2.

The above compounds of the present invention shall hereinafter be referred to generically as "salicylanilides."

In carrying out the present invention, any technique may be used so long as a gastropod is contacted with a toxicant of the present invention at a concentration sufficient that the gastropod dies as a result of the said contact. The exact time of exposure is dependent upon a variety of factors including water temperature, the particular type of gastropods to be exterminated, expected or known duration of gastropod contact with treated water, nature and content of organic matter in, or in contact with, water if any; incidence of sunlight, daylight length and other seasonal factors. In accomplishing the purpose of the present invention, the toxicant compound can be applied to the gastropod's habitat and/or food supply so that the gastropod ingests or absorbs a gastropodicidal amount of the toxicant compound. When employing the toxicant compound of the present invention to kill gastropod ova the toxicant is applied to the ova or their habitat in an ovicidal amount. When it is desired to depopulate an area of gastropods for an extended period of time, the toxicant compound or compounds can be applied at intervals in order to control any population which has become established subsequent to the preceding application. It may also be desirable to maintain the toxicant at a continuous, low, gastropodicidal level of concentration. Such low levels are conveniently maintained in bodies of water by dispersing the toxicant in water in the form of pellets prepared with water-insoluble, or slowly-soluble, carrier material which disperses, dissolves, or yields the toxicant slowly by leaching to the water over a period of time. Certain of the gastropods such as some of the snails are dependent upon a body of water. A gastropod is regarded herein as being dependent upon a body of water if it is aquatic or amphibious.

Concentrations to be employed in water vary, depending upon a variety of factors including water temperature, the particular type of gastropods to be exterminated; expected or known duration of gastropod contact with treated water, nature and content of organic matter in, or in contact with, water if any; incidence of sunlight, daylight length and other seasonal factors. In general, good control of gastropods and gastropod ova are obtained in still water when a concentration of from about 1 to about 5 parts toxicant by weight per million parts water by weight, are employed. When it is desired to obtain a quick kill of aquatic snails and their eggs as may be necessary in lakes, ponds, rivers and streams with moderate to rapid current, higher concentrations up to as high as 100 or 500 parts toxicant per million parts water, by weight, can be employed. When a quiescent body of water is to be treated, under relatively warm water temperature conditions (water about 80° F. at the surface, for example) and prolonged contact is possible, concentrations maintained as low as 1.0 part toxicant per million parts water can be used, with contact durations as great as several weeks. For best results in obtaining good kills of gastropod ova it is preferred to employ the salicylanilide toxicants at a concentration of at least 2 parts per million.

Under field conditions, in still water concentrations typically employed are on the order of 4 parts of toxicant per million parts of water, all by weight. Where toxicity to other animal forms is not a factor, higher concentrations up to 10 or more may be employed. Concentration as high as 500 parts per million can be employed, however, such high concentrations are not usually necessary. Such concentrations give good control of gastropods and/or their ova.

In general, methods of civil and hydraulic engineering can be applied for obtaining sufficiently accurate estimates of water volumes and flows in natural bodies of water in order to calculate proper dosages of toxicants. Moreover, most aquatic gastropods, even truly aquatic fresh water snails and their eggs tend to live in only shallow waters or in the upper parts and near the shores of deeper water; hence, uniform dispersion of the toxicant throughout the entire body of water is not essential.

When it is desired, as it often is, to effect control of such gastropods and their ova with a minimum of side effects upon other components of the entire biota, and in particular to avoid harm to fish, littoral plants, warm-blooded animals, and the like, then the combination of concentration of toxicant and exposure time, will be chosen to represent a minium gastropodicidal dosage. In standing bodies of water with little or no inflow and outflow, it is possible to control the concentration, but duration of exposure will depend upon time elapsed until reaction and precipitation, together with bio-degradation and other factors, have detoxified the water; this will, in turn, depend upon many local natural factors. In running bodies of water of which the current moves at a known rate, the duration of exposure at an initial site can be controlled with a fair degree of accuracy.

Known techniques for the chemical treatment of bodies of water can be used such as constant flow or metering devices, or aerial application or application from a small boat, making use of the known solubility, dispersibility, and the like, of the toxicant substance employed.

When, through tidal action, drainage, control of dam spillways and the like, the gastropods and/or their eggs are exposed, the wet, exposed land bearing a gastropod population and/or egg masses can be sprayed or dusted with formulations prepared as for routine agricultural application. The toxicant compounds of the present invention can also be applied to plants and plant parts where the gastropods may ingest the toxicant.

More particularly, salicylanilide toxicants are readily dispersible in water and can be distributed in, or over the water, wet land or plants to be treated, in the form of a dust of either the pure toxicant or the toxicant admixed with a solid diluent or adjuvant. Such diluent solid can be an inert substance such as infusorial earth, clay, talc, chalk, woodflour, or the like. The toxicant can be distributed in this kind of substance by grinding toxicant and diluent or adjuvant together, by grinding them separately and admixing, or by dispersing the salicylanilide toxicant in a liquid which is then dispersed in the solid with subsequent grinding after the liquid has been evaporated, if desired. The solid compositions can also be combined with dispersing agents in order to provide wettable powder compositions.

A carrier in coarsely particulate form adapted for slow release of toxicant such as a porous fritted glass, or a porous fired clay can be used. A solvent solution of the toxicant is dispersed in such material and the solvent thereafter removed by vaporization. Other such carriers are known. In addition, the toxicant materials of the present invention can be employed in granular compositions prepared in accordance with known granulating techniques to provide for the release of the toxicant over a prolonged period of time. Such known granulating techniques employ vegetable gums, shellac etc.

Also the toxicant can be dissolved in water or organic solvent; in either case, but especially in the case of organic solvent, a wetting agent as emulsifying dispersant can be added. Such preparations are adapted for prompt and often spontaneous dispersion when added to water, as an emulsion of toxicant in water. For convenience in measuring out an employed amount, such preparation can be diluted with further organic liquid, or with water; or for convenience in shipment and storage, can be prepared as a concentrate in which the contained amount of toxicant approaches the theoretical maximum for the solvent-dispersant system employed. At dam spillways and the like, such high concentrations can be directly employed, relying upon water turbulence for mixing.

The quantity of toxicant per unit of preparation is not critical; so long as the preparation can be employed to distribute the toxicant in gastropodicidal amounts in the body of water to be treated, good results are obtained. The concentration of toxicant in liquid concentrate compositions generally is from about 1 to 50 percent by weight. Concentrations up to 95 percent by weight oftentimes are conveniently employed in solid concentrates. In dusts, the concentration of the toxicant can be from about 1 to 10 percent by weight. In compositions to be employed as concentrates, the toxicant can be present in a concentration of from 5 to 98 percent by weight.

The following examples are merely illustrative and are not intended to be limiting.

EXAMPLE 1

Snails of the species *Australorbis glabratus* which is known to be a vector for schistosomiasis were treated with various salicylanilides as the sole toxicant material. In such operations 3 milligrams of the toxicant material is dissolved in 3 milliliters of acetone. An aliquot of the toxicant solution is then removed and dispersed in water in an amount sufficient to provide aqueous compositions containing the toxicant compound at a concentration of 2 parts per million by weight. Into these aqueous, toxicant-containing compositions are placed 9 week old (9–12 mm.) *Australorbis glabratus* snails. The snails are exposed to the toxicant compositions for 24 hours without aeration or food. During the exposure period, the temperature of the aqueous toxicant compositions is maintained at 28°±0.5° C. Following the exposure period, the snails are rinsed with water and placed, for a recovery period of 48 hours, in water suitable for the maintenance of snails. During the recovery period normal food and aeration are provided. In such operations 3,5-dibromo-2'-ethoxysalicylanilide, 3,5-dibromo-4'-ethoxysalicylanilide, 3,5-dibromo-3'-chloro-4'-methoxysalicylanilide, 3,5-dibromo-4'-chloro-3'-methoxysalicylanilide, 3,5-dibromo-4'-chloro-2',5' - dimethoxysalicylanilide, 3,5 - dibromo-4'-methoxysalicylanilide and 3,5 - dibromo - 5'-chloro-2'-methoxysalicylanilide each, when employed as the sole toxicant compound give complete kills of the test snails when employed at concentrations of 2 parts per million by weight.

In a check operation, an amount of acetone equivalent to five times the amount of acetone employed to dissolve the toxicant compound is dispersed in water. No toxicant compound is present in the acetone-water mixture. *Australorbis glabratus* snails are exposed to the acetone-water mixture in exactly the same manner as the snails are exposed to the toxicant composition as described in the preceding paragraph. Following the exposure to the acetone-water mixture the snails are further treated exactly as the snails exposed to the toxicant compound. This procedure is used as a check in order to ascertain what, if any, gastropod mortality is caused by the acetone. It is ascertained that the acetone is without evident effect of any kind upon snails of the genus Australorbis. This is taken to indicate that in the present example, toxic effects upon snails can be assumed to be caused only by the toxicant compound tested.

EXAMPLE 2

In further operations, carried out as set forth in Example 1, 3,5-dibromo-5'-chloro-2'-methoxysalicylanilide,
3,5-dibromo-2'-chloro-4'-methoxysalicylanilide,
3,5-dibromo-2'-chloro-4'-ethoxysalicylanilide,
3,5-dibromo-2'-bromo-5'-methoxysalicylanilide,
3,5-dibromo-2'-bromo-4'-ethoxysalicylanilide,
3,5-dibromo-4'-bromo-2',6'-dimethoxysalicylanilide,
3,5-dibromo-2'-bromo-5'-ethoxysalicylanide,
3,5-dibromo-5'-chloro-2',3'-dimethoxysalicylanilide,
3,5-dibromo-2'-chloro-6'-methoxysalicylanilide,
3,5-dibromo-3'-bromo-4'-methoxysalicylanilide,
3,5-dibromo-3'-chloro-4'-ethoxysalicylanilide,
3,5-dibromo-3'-chloro-4'-ethoxysalicylanilide,
3,5-dibromo-4'-bromo-3'-methoxysalicylanilide,
3,5-dibromo-4'-bromo-3'-methoxysalicylanilide,
3,5-dibromo-4'-chloro-3'-ethoxysalicylanilide,
3,5-dibromo-3,5-dibromo-4'-chloro-2'-methoxysalicylanilide,
3,5-dibromo-4'-bromo-3',5'-dimethoxysalicylanilide,
3,5-dibromo-4'-chloro-2',4'-dimethoxysalicylanilide,
3,5-dibromo-4'-bromo-2'-methoxysalicylanilide,
3,5-dibromo-4'-chloro-2',5'-diethoxysalicylanilide and
3,5-dibromo-6'-bromo-3',4'-diethoxysalicylanilide, each when employed as the sole toxicant compound at a concentration of 4 parts per million by weight give complete kills of the Australorbis snails.

The salicylanilide compounds of the present invention are prepared by known procedures. In a representative known procedure equimolar proportions of a suitably substituted salicylic acid and aniline or a suitable substituted aniline are contacted with phosphorous oxychloride in the presence of benzene. The reaction mixture thus formed is then heated at the boiling temperature and under reflux for from one to two hours. Thereafter, the product which precipitates in the reaction mixture as a crystalline solid is collected by such conventional procedures as decantation or filtration.

What is claimed is:
1. The method which comprises contacting gastropods, their ova and their habitats with a gastropodicidal amount of a toxicant compound selected from the group of halo-salicylanilides corresponding to the formula

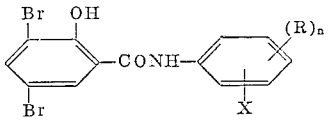

wherein R represents a member of the group consisting of methoxy and ethoxy, X represents a member of the group consisting of chlorine, bromine and hydrogen and $n$ represents one of the integers 1 and 2.

2. The method claimed in claim 1 wherein the contacting is carried out by dispersing the toxicant in the body of water in which the gastropod or gastropod ova are dependent.

3. The method claimed in claim 1 wherein the halo-salicylanilide is selected from the group consisting of
3,5-dibromo-2'-ethoxysalicylanilide,
3,5-dibromo-4'-methoxysalicylanilide,
3,5-dibromo-4'-chloro-3'-methoxysalicylanilide,
3,5-dibromo-3'-chloro-4'-methoxysalicylanilide,
3,5-dibromo-5'-chloro-2'-methoxysalicylanilide,
3,5-dibromo-4'-chloro-2',5'-dimethoxysalicylanilide and
3,5-dibromo-4'-ethoxysalicylanilide.

References Cited
UNITED STATES PATENTS

| 3,079,297 | 2/1963 | Schraufstatter et al. | 167—31 |
| 3,332,996 | 7/1967 | Zerweck et al. | 260—559 |
| 3,375,160 | 3/1968 | Early et al. | 167—31 |

ALBERT T. MEYERS, Primary Examiner

D. M. STEPHEN, Assistant Examiner